United States Patent [19]
Toya et al.

[11] Patent Number: 5,350,993
[45] Date of Patent: Sep. 27, 1994

[54] POWER SUPPLY

[75] Inventors: Shoichi Toya, Mihara; Tetsuya Okada, Sumoto, both of Japan

[73] Assignee: Sanyo Electric Co., Ltd., Osaka, Japan

[21] Appl. No.: 4,574

[22] Filed: Jan. 14, 1993

[30] Foreign Application Priority Data

Jan. 20, 1992 [JP] Japan .................. 4-007955

[51] Int. Cl.$^5$ .............................................. H02J 7/00
[52] U.S. Cl. ........................................ 320/2; 320/15
[58] Field of Search ............... 320/2, 13, 15; 455/89, 455/90

[56] References Cited

U.S. PATENT DOCUMENTS

| | | | |
|---|---|---|---|
| 4,577,144 | 3/1986 | Hodgman et al. | 320/2 |
| 4,709,201 | 11/1987 | Schaefer et al. | 320/2 |
| 4,849,682 | 7/1989 | Bauer et al. | 320/15 |
| 5,164,652 | 11/1992 | Johnson et al. | 320/2 |
| 5,184,059 | 2/1993 | Patino et al. | 320/15 |
| 5,191,277 | 3/1993 | Ishikura et al. | 320/2 X |
| 5,200,686 | 4/1993 | Lee | 320/2 |

FOREIGN PATENT DOCUMENTS 118162  7/1988  Japan .

*Primary Examiner*—Kristine L. Peckman
*Attorney, Agent, or Firm*—Wenderoth, Lind & Ponack

[57] ABSTRACT

A battery pack is selectively connectable to electrical equipment and to a battery charger. The electrical equipment or battery recharger decides whether the attached battery pack is a compatible device. If the attached battery pack is determined to be suitable, electrical power is transferred from the battery pack to the electrical equipment or from the battery recharger to the battery pack. To determine whether the battery pack is compatible, the electrical equipment or battery recharger receives an electrical signal, from the battery pack, containing battery information by which the type of battery pack can be distinguished.

6 Claims, 3 Drawing Sheets

POWER SUPPLY

BACKGROUND OF THE INVENTION

This invention relates to a power supply configured as a battery pack, electrical (electronic) equipment power by the battery pack, and a battery charger for recharging the battery pack.

A battery pack containing a plurality of batteries, such as Ni-Cd (nickel-cadmium) batteries, is currently well known. The battery pack is attached to a variety of electrical equipment to supply electrical power. In addition, a discharged battery pack is connected with a battery charger, re-charged, and used again.

It is a requirement that the battery pack conform to parameters, such as current and voltage, for activating the particular electrical equipment in use. For this reason, many varieties of battery packs have been developed. Various battery packs are manufactured with differing battery voltages and capacities which are designed to meet specifications of various electrical equipment. Depending on the internal batteries, etc. of battery packs having different voltages or capacities, different optimum charging currents and charging times are necessary. For this reason many different types of battery chargers have been developed. Use of a battery pack which does not meet electrical equipment or battery charger specifications invites the danger of electrical equipment malfunction, or a battery charging malfunction such as over-charging or insufficient charging of the battery pack. Further, this can be expected to contributed to electrical equipment or battery charger failure, or to battery pack lifetime reduction due to repeated out-of-specification charge-discharge cycles. Consequently, a strategy to only allow use of battery packs which meet electrical equipment and battery charger specifications is necessary.

Technology to solve this type of problem is described In Japanese Utility Model Laid-open No. 63-118162 (1988). In this disclosure, recessed and protruding regions are provided on the battery pack surface which mates with the main body of the electrical equipment. The battery pack's recessed and protruding regions assume different shapes depending on the type of internal batteries, etc, The main body of the electrical equipment is configured to connect with a battery pack having specific recessed and protruding regions. With this type of battery pack, attachment to the main body of the electrical equipment can be restricted by the shape of the recessed and protruding regions corresponding to the type of batteries accepted. The result of this is that battery packs which meet electrical equipment specifications can be selectively attached, and problems such as electrical equipment malfunction can be prevented, However, with this type of battery pack having recessed and protruding regions to mate with the shape of the electrical equipment, recessed and protruding regions of various different shapes must be formed on different battery packs in order to distinguish compatible and incompatible batteries. This results not only in the drawback that forming the battery pack case is complicated, but also that it is not suitable for mass production since different cases are required corresponding to different battery packs.

SUMMARY OF THE INVENTION

The present invention was developed to solve the above mentioned problems. It is thus a primary object of the present invention to provide a power supply distinguishes whether a compatible or incompatible battery pack has been attached regardless of the shape of its outer case.

In the power supply of this invention, an electrical signal is output from the battery pack to electrically discriminate a compatible battery pack from an incompatible battery pack. The battery pack is provided with signal output terminals (connectors) from which an electrical signal is output which discriminates compatible and incompatible battery packs. Electrical equipment and battery chargers are provided with terminals that connect with the signal output terminals of the battery pack. The battery pack outputs an electrical signal to the electrical equipment or battery charger via its signal terminals. The electrical equipment or battery charger processes the electrical signal output from the battery pack and determines whether the attached battery pack is compatible or not.

In one preferred embodiment, the battery pack stores battery information in arithmetic circuitry. The battery information is indicative of battery characteristics, for example, battery pack output voltage, battery pack capacity, internal battery type, electrical characteristics, and battery manufacturer's name. When a battery pack including such arithmetic circuitry is attached to electrical equipment or a battery charger, the signal terminals of the battery pack make contact with the signal terminals of the electrical equipment or battery charger- The battery pack outputs the stored battery information to the electrical equipment or battery charger via the signal terminals. The electrical equipment or battery charger performs arithmetic operations on the battery information signal output from the battery pack and determines if the battery pack is compatible. If the particular device determines that the battery pack is compatible, electrical power transfer is begun. If the device decides that the battery pack is not compatible, electrical power transfer is not begun. For this reason, even when an incompatible battery pack is attached, improper electrical equipment operation or battery charging malfunctions, such as over-charging or under-charging, will not occur. Furthermore, since the battery pack type is decided by an electrical signal from the signal terminals, there is o requirement for different recessed and protruding regions for different types of battery packs as in prior art.

DETAILED DESCRIPTION OF THE INVENTION

Figure 1:
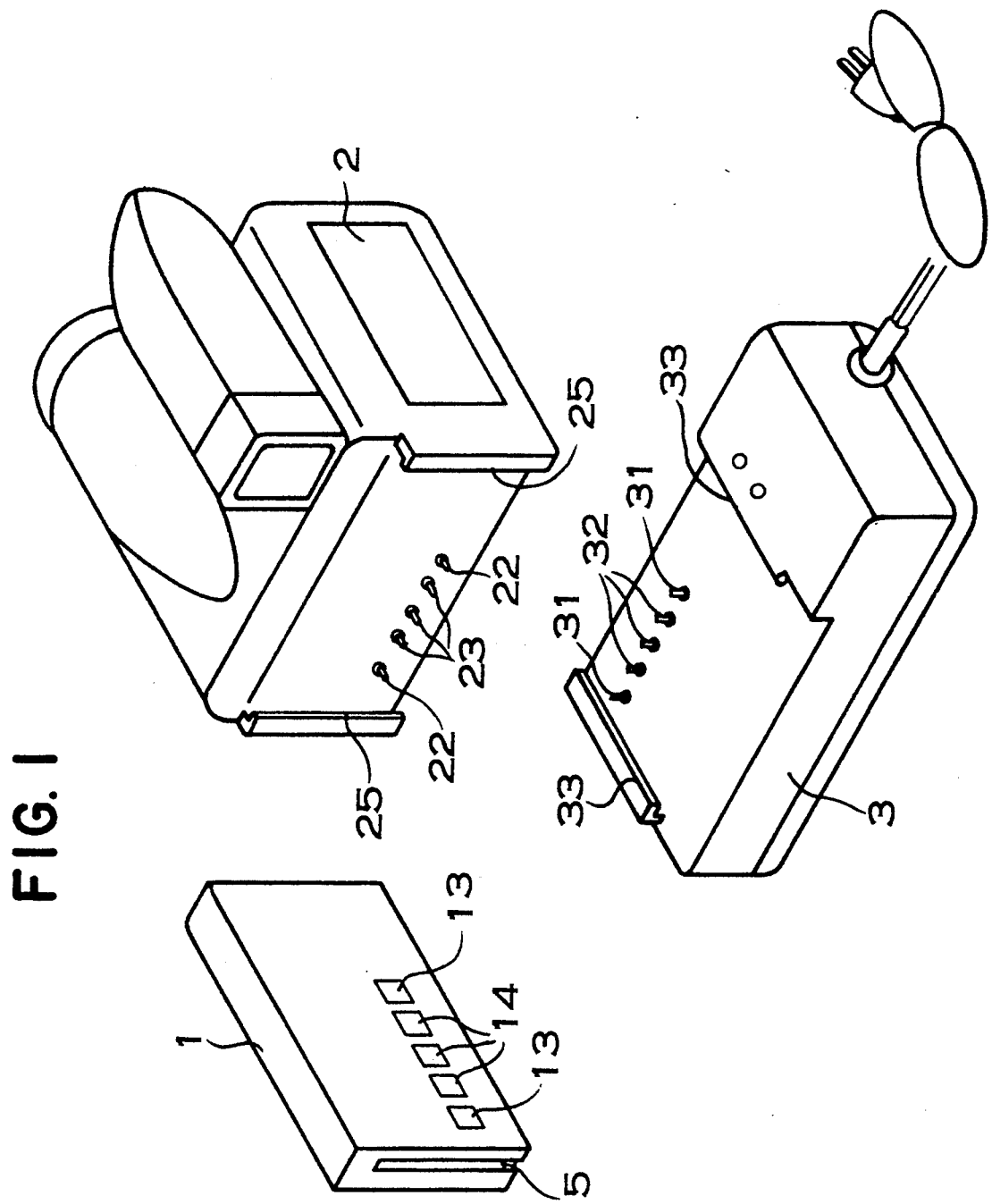
FIG. 1 is a perspective view of a battery pack, video equipment, and a battery charger.
Figure 2:
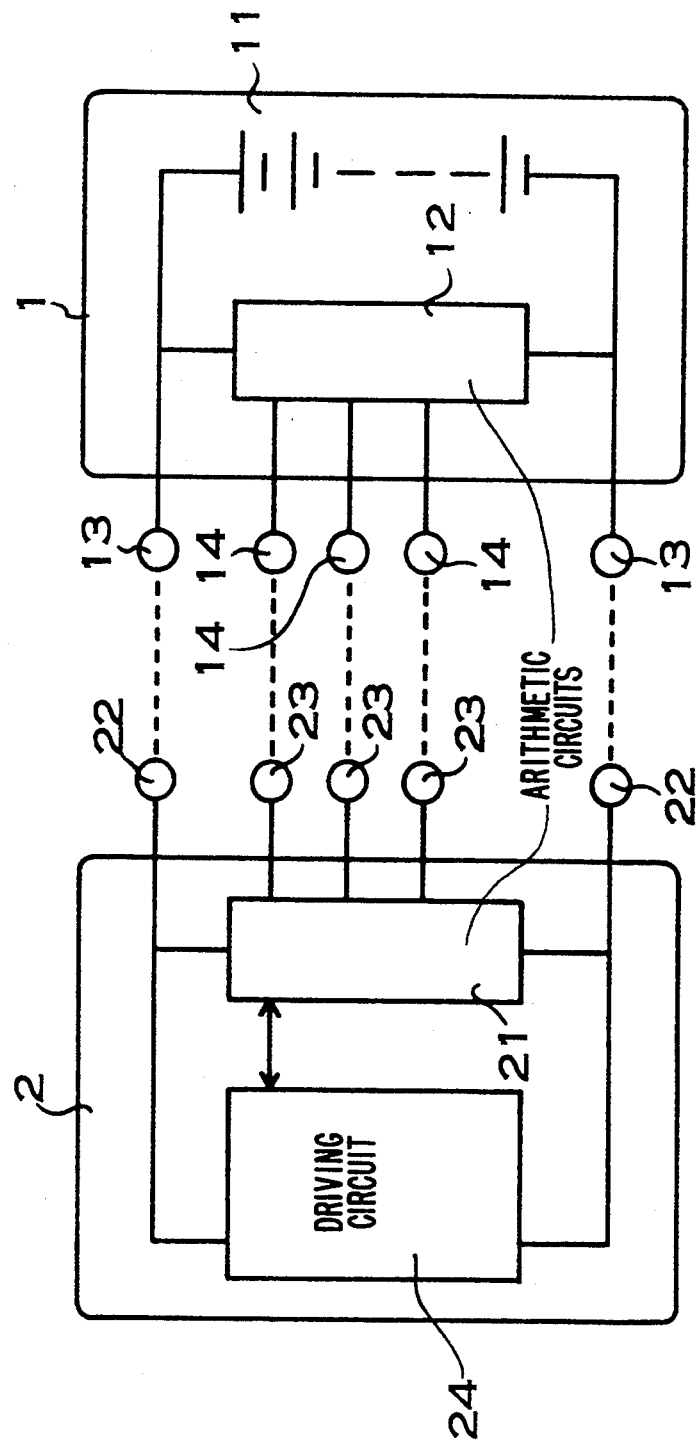
FIG. 2 is a schematic circuit diagram of a battery pack connected with video equipment.

The following describes in detail an embodiment of the present invention. Turning to FIG. 1, reference numeral 1 designates a battery pack. As shown in FIG. 2, this battery pack contains a plurality of series connected Ni-Cd batteries 11 and an arithmetic circuit 12. The battery pack 1 is also provided with +/− charge and discharge battery terminals 13 to extract power from the Ni-Cd batteries 11 and signal terminals 14 to handle output from the arithmetic circuit 12.

In FIG. 1, reference numeral 2 designates video equipment representative of an electrical device. As shown in FIG. 2, the video equipment 2 is provided with an arithmetic circuit 21, and input terminals 22 and signal terminals 23 which make contact with the +/− charge and discharge battery terminals 13 and signal terminals 14, respectively, on the mating surface of the battery pack 1. A driving circuit 24 of the video equipment is also provided. In FIG. 1, reference numeral 3 designates a battery charger. The battery charger shown in this figure is provided with an arithmetic circuit (not illustrated), output terminals 31, and signal terminals 32 which make contact with the +/− charge and discharge battery terminals 13 and signal terminals 14 on the mating surface of the battery pack 1.

The battery pack 1 is selectively attached to either the video equipment 2 or the battery charger 3, and may power the video equipment 2 or be recharged by the battery charger 3. Attachment grooves 15 are defined in the case of the battery pack 1, and protruding attachment rails 25, 33 which slide in the attachment grooves 15 are formed on the video equipment 2 and battery charger 3.

Figure 3:
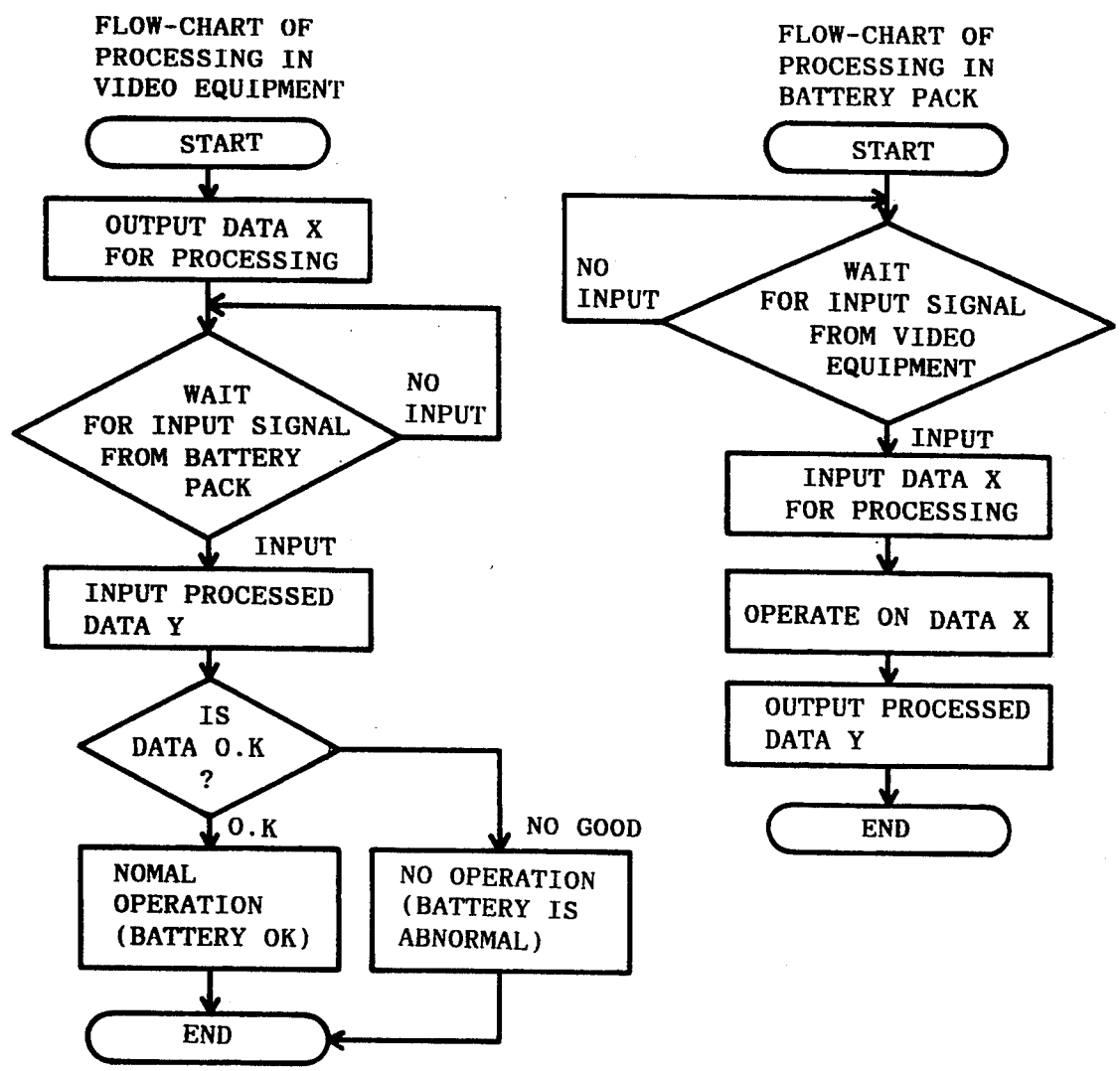
FIG. 3 is a flow chart of the operation of the battery pack and the video equipment.

The operation of a battery pack, electrical equipment, and battery charger configured as described above, is explained with reference to the flow-chart of FIG. 3.

(1) First the battery pack 1 is attached to the video equipment 2. At this time, the +/− charge and discharge battery terminals 13 and signal terminals 14 of the battery pack 1 connect with the input terminals 22 and signal terminals 14 respectively of the video equipment 2.

(2) The video equipment arithmetic circuit 21 detects connection of the battery pack 1, and as a result issues data x from signal terminals 23 for processing.

(3) The data x, output From the video equipment, is input to the arithmetic circuit 12 of the battery pack 1 via the signal terminals 14 of the battery pack 1.

(4) When the data x is input from the video equipment, the arithmetic circuit 12 of the battery pack 1 operates on that signal and issues processed data y (y=f(x)). The processed data y output from the arithmetic circuit is a signal that serves to distinguish compatible and incompatible battery packs, and includes battery information such as the battery pack output voltage, power capacity, internal battery type and electrical characteristics, and the name of the internal battery manufacturer. This type of battery information can be stored in the arithmetic circuit 12.

(5) The processed data y, output from the battery pack 1, is input to the arithmetic circuit 21 of the video equipment via the signal terminals 23 of the video equipment.

(6) The arithmetic circuit 21 of the video equipment makes a decision based on the input data y. If the data y, output from the battery pack 1, agrees with a pre-stored value, the video equipment arithmetic circuit 21 decides that the battery pack 1 meets the video equipment specifications and is a compatible battery.

(7) In this state, the video equipment assumes conditions for use of the battery pack 1 as a power supply.

(8) On the other hand, if the battery pack data y does not agree with the pre-stored value, the video equipment arithmetic circuit 21 judges the battery pack as an unusual type not compatible with the video equipment. In this state, the video equipment electrically disconnects the battery pack as a power supply. In this situation, although not illustrated, it is also desirable for the video equipment 2 to display an error message.

Further, when the battery pack 1 is connected to the battery charger 3, again it is decided whether the battery pack is compatible or not in the same manner of operation as with its connection to the electrical equipment. When the battery pack is Judged compatible, an electrical connection is made and battery charging occurs, and when it is judged incompatible, electrical power transfer is stopped.

When the electrical equipment or battery charger is designed, as described above, to output data x to an attached battery pack and then read [processed data y containing battery information from the battery pack, the battery pack can be designed to output the processed data y when data x is input. However, it is obvious that the battery pack arithmetic circuit of the present invention can also be designed to issue processed data y at the time when the battery pack is attached to the electrical equipment or the battery charger. In this case, there is no need for the electrical equipment or battery charger to issue data when the battery pack is attached.

According to the invention, when an incompatible battery pack is attached, electrical power transfer with the battery pack does not occur. Therefore, the dangers of electrical equipment malfunction or battery charging problems such as over-charging or under-charging are not incurred. Further, since discrimination of the battery pack's compatibility or incompatibility is made by the exchange electrical signals through signal terminals, there is no requirement to form different recessed and protruding regions on each different battery pack as in prior art, and the battery pack outer case can be standardized in a fashion suitable for production in large quantities. Still further, since this type exchange of electrical signals cannot be established by outward appearances, production of imitation products can be prevented. The industrial value of this cannot be overstated.

We claim:
1. A battery pack comprising:
  rechargeable batteries;
  charge and discharge battery terminals selectively connectably to input terminals of electrical equipment such that the equipment can be supplied with electrical power from said batteries and to charger output terminals of a battery recharger such that the batteries can be recharged by the battery recharger;
  an arithmetic circuit including a memory in which information indicative of characteristics of said rechargeable batteries is stored and which circuit generates a signal representative of said information when either one of the electrical equipment and the battery recharger are connected to the battery pack; and
  signal terminals operatively electrically connected to said arithmetic circuit and selectively connectable to the electrical equipment and to the battery recharger, the signal generated by said arithmetic circuit being output from the battery pack from said signal terminals.

2. A battery pack as claimed in claim 1, wherein said arithmetic circuit includes a processor which processes data input thereto from either one of the piece of electrical equipment and the battery recharger via said signal terminals, and generates said signal based on the processed data.

3. The combination of a battery pack and electrical equipment to which said battery pack is connectable;
said battery pack including
rechargeable batteries,
battery terminals,
first arithmetic circuit including a memory in which information indicative of characteristics of the rechargeable batteries is stored and which circuit generates a signal representative of said information, and
first signal terminals operatively electrically connected to said arithmetic circuit; and
said electrical equipment including input terminals connectable to the battery terminals of said battery pack,
second signal terminals connectable to the first signal terminals of said battery pack, and
a second arithmetic circuit operatively electrically connected to said second signal terminals, said second arithmetic circuit including a memory in which a value is stored, and a processor which receives the signal generated by said first arithmetic circuit via said first and second signal terminals when the battery pack is connected to the electrical equipment, compares said signal to said value to determine whether the battery pack is compatible with the electrical equipment, and selectively outputs signals which allow and prevent electric power from being transferred from the batteries of said battery pack to said electrical equipment on the basis of the determination of whether the battery pack is compatible with the electrical equipment.

4. The combination of a battery pack and electrical equipment as claimed in claim 3, wherein said second arithmetic circuit outputs data to the battery pack via said first and second signal terminals when the electrical equipment and the battery pack are connected, and said first arithmetic circuit includes a processor which processes the data output by the electrical equipment in generating said signal representative of the information indicative of the characteristics of said rechargeable batteries.

5. The combination of a battery pack and battery recharger to which the battery pack is connectable; said battery pack including
rechargeable batteries,
battery terminals,
a first arithmetic circuit including a memory in which information indicative of characteristics of the rechargeable batteries is stored and which generates a signal representative of said information, and
first signal terminals operatively electrically connected to said arithmetic circuit; and
said battery recharger including output terminals connectable to the battery terminals of said battery pack,
second signal terminals connectable to the first signal terminals of said battery pack, and
a second arithmetic circuit operatively electrically connected to said second signal terminals, said second arithmetic circuit including a memory in which a value is stored, and a processor which receives the signal generated by said first arithmetic circuit via said first and second signal terminals when the battery pack is connected to the battery recharger, compares said signal to said value to determine whether the battery pack is compatible with the battery recharger, and selectively outputs signals which allow and prevent electric power from being transferred from said battery recharger to the rechargeable batteries of said battery pack on the basis of the determination of whether the battery pack is compatible with the battery recharger.

6. The combination of a battery pack and battery recharger as claimed in claim 5, wherein said second arithmetic circuit outputs data to the battery pack via said first and second signal terminals when the battery recharger and the battery pack are connected, and said first arithmetic circuit includes a processor which processes the data output by the battery recharger in generating said signal representative of the information indicative of the characteristics of said rechargeable batteries.

* * * * *